United States Patent [19]

Blanchard

[11] 4,090,240
[45] May 16, 1978

[54] METHOD AND AID FOR PREPARING NC CONTROL PROGRAMS FOR MACHINE TOOLS

[76] Inventor: Vernon F. Blanchard, 35406 Brookview, Livonia, Mich. 48152

[21] Appl. No.: 696,858

[22] Filed: Jun. 16, 1976

[51] Int. Cl.² ............................................. G06G 1/00
[52] U.S. Cl. .................................. 364/300; 318/568; 35/52; 33/1 M
[58] Field of Search .......................... 33/174 PC, 1 M; 318/568; 35/52; 235/151.11; 444/1

[56] References Cited

U.S. PATENT DOCUMENTS

| | | | |
|---|---|---|---|
| 3,486,209 | 12/1969 | Shultz et al. | 29/27 |
| 3,543,392 | 12/1970 | Perry et al. | 408/70 X |
| 3,624,371 | 11/1971 | Neal et al. | 318/568 X |
| 3,629,558 | 12/1971 | Coggin | 318/568 X |

OTHER PUBLICATIONS

"Controlling Numerically Controlled Machines;" IBM Technical Disclosure Bulletin, vol. 14, #11, Apr. 1972, pp. 3466–3470.

*Primary Examiner*—Eugene G. Botz
*Attorney, Agent, or Firm*—Krass & Young

[57] ABSTRACT

A method of preparing a program for numerically controlled machine tools is disclosed involving the use of an aid comprised of a model representing the workpiece to be machined and the tooling to perform the machining process, mounted to have a capability for relative movement along axes corresponding to the relative movement occurring during the machining process. Standardized preset tools and tool holders are established for use in the actual machining processes and corresponding model representations of such standardized preset tools and tool holder combinations are provided which can be located in the model in the same relative position as the corresponding actual tools and tool holders will be located in the machine tool. In preparing the NC program, a machinist prepares a machining process, selecting tools and holders from the available standardized preset tools, and specifies the various machining steps, spindle speeds, in-feed rates, etc. to be utilized in machining the workpiece. The programmer, utilizing the model as an aid for creating a physical representation of the actual machining sequence, then prepares a control program listing, utilizing built-in scales along the axes of motion provided in the model to establish directly by reference to such scales the position of the machine tool at various stages in the sequence specified by the machinist. The final dimensional cuts are calculated from the dimensions of the workpiece specified in the drawing. The actual implementation disclosed corresponds to programming of a turret lathe with a two-dimensional model thereof utilized, including a representation of the turret indexing movement.

5 Claims, 2 Drawing Figures

METHOD AND AID FOR PREPARING NC CONTROL PROGRAMS FOR MACHINE TOOLS

BACKGROUND OF THE INVENTION

1. Field of the Invention

This invention is concerned with preparation of control programs for numerically controlled machine tools.

2. Brief Description of the Prior Art

Numerically controlled machine tools have enjoyed great success in recent years, particularly for the production in moderate volume of precision parts such as are common in the aerospace industries since both the cost and accuracy of the finished product are considerably improved over conventional machining methods in which highly skilled machinists manually set up and carry out the machining processes. In these machines the control of the machine tool movements with respect to the workpiece is accomplished by means of an automated control program which may also control automatic tool changing mechanisms and sequencing thereof so that workpieces may be automatically machined.

A rather substantial practical difficulty is encountered by users of such equipment however in creating the control programs which are necessary for machining of a given part and this is particularly exacerbated in the case of small to medium volume usage of such equipment. This difficulty arises from the nature of programming methods which have been utilized in the past, i.e., an experienced programmer who himself must decide the machining methods and sequences to be utilized in carrying out the process, must, from a mere inspection of the part drawings, conceptualize in his mind the entire sequence of events, which sequence can involve an enormous number of individual control commands to the machine tool. This is so even to carry out relatively simple machining steps such as the position of the cutting tool during indexing, the extent of rapid traverse movement, the initiation of a slow in-feed, the in-feed rate, the spindle rotation rate, etc. Great care must be exercised since it is usually critical that the relative position of the workpiece and the cutting tools be calculated to prevent interference damage, such as broken tools, etc. caused by errors in properly positioning the various parts.

Thus, the mental effort required to carry out the composing of an entire program listing can be nightmarish and painstaking to the point where mistakes are impossible to avoid and a great deal of time is consumed in such program preparation. As noted, this problem is further exacerbated in the situation of the small to medium user of such equipment due to the almost absolute necessity of using an experienced machinist or at least one who is fully informed as to the methods of carrying out the machining processes. That is, small businesses seldom would have the volume of programming work necessary to justify the use of the services of a full-time programmer, yet on the other hand, can ill afford the loss even for a few days of their skilled machinists for this purpose. Other disadvantages are that such employees seldom are satisfied with such dual capacity duties, generally considering themselves either machinists or programmers, not both, thus creating employee relations problems.

Furthermore, the commingling of machinists and programmer skills renders the basic programming task akin to alchemy poorly understood by others within the business organization, including the business managers. This difficulty in understanding the process leads to both undue dependence on the individual charged with execution of this task, but also creates a certain reluctance in the minds of managers who would otherwise seize on the benefits of this equipment but hesitate to do so due to their lack of understanding.

It is, therefore, an object of the present invention to provide a method of preparing such program tapes and an aid for use in such preparation which reduces the required level of conceptualization of the actual process by the programmer.

It is a further object of the present invention to provide a method and aid for such preparation of control programs which greatly reduces the need for calculation of the relative position of the workpiece and cutting tool in preparing a program listing.

It is yet another object of the present invention to provide such method and aid which greatly simplifies the preparation of the program listing by the programmer and allows the programmer relatively unknowledgeable in machining processes to obtain information from a skilled machinist which can be easily used by programmer to carry out the preparation of the program listing.

SUMMARY OF THE INVENTION

These and other objects which will become apparent upon a reading of the following specification and claims is accomplished by a method involving the use of an aid comprised of a model representing the workpiece to be machined and the tooling to perform the machining process, mounted to have a capability for relative movement along axes corresponding to the relative movement occurring during the machining process. Standardized preset tools and tool holders are established for use in the actual machining processes and corresponding model representations of such standardized preset tools and tool holder combinations are provided which can be located in the model in the same relative position as the corresponding actual tools and tool holders will be located in the machine tool. In preparing the NC program a machinist prepares a machining process, selecting tools and holders from the available standardized preset tools, and specifies the various machining steps, spindle speeds, in-feed rates, etc. to be utilized in machining the workpiece. The programmer utilizing the model as an aid for creating a physical representation of the actual machining sequence, then prepares a control program listing, utilizing built-in scales along the axes of motion provided in the model to establish directly by reference to such scales the position of the machine tool at various stages in the sequence specified by the machinist. The final dimensional cuts are calculated from the dimensions of the workpiece specified in the drawing.

DETAILED DESCRIPTION

Figure 1:
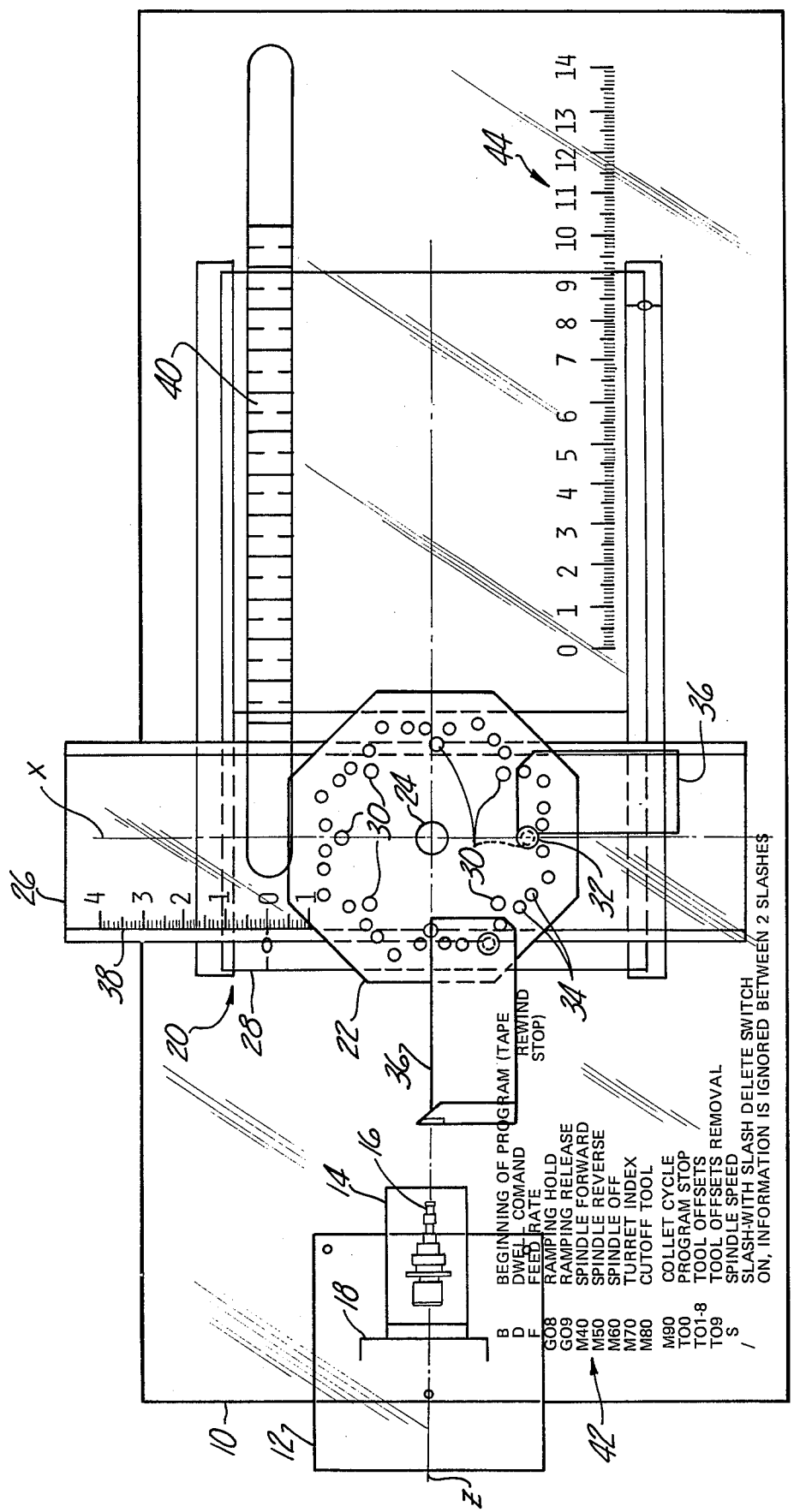
FIG. 1 is a plan view representation of a model utilized as an aid in preparing control programs in the method of the present invention.

In the following specification and claims, specific terminology will be resorted to and a particular embodiment described; i.e., the application of the method to an NC controlled lathe, which application allows for a two-dimensional model of the workpiece and the machine movements necessary in carrying out such machining. But it is to be understood that the invention has application to other machine tools involving the use of three or more axes of movement. The specific embodiment described is merely exemplary of the invention.

It should be noted at the outset that one of the difficulties in the prior art approach to preparation of control programs has been in the communication between the machinist and and the programmer, the form of which communication made necessary the knowledgeability of the programmer in terms of knowledge of machining processes. That is, the machinist could select a great variety of alternate tool selections and sequences in the machining of any given part, each of which discretionary selections would affect the program and accordingly be a complicating factor in preparation of the program. A second problem, particularly for lathes, has been the need to relate the tool position as actually mounted in the machine to the position assumed by the program, since the tooling when mounted in the lathe would be more or less randomly positioned. This requires a time consuming set up procedure to establish the offset so that correction factors could be established. It also requires a conceptualization of the position of the tool by the programmer in locating it with respect to the workpiece and the tool holder.

In the present invention a model of the machine tool and workpiece arrangement is utilized and the communication between the machinist and the programmer is reduced to a recitation of a few essential items. These items are established to be in equivalent terms of the actual machine tool and the model, with a simple designation of tools and tool holders and corresponding models thereof by the machinist enabling the programmer to accurately determine the relative position of the major components of the system. These relative positions are identical in the model and in the actual machine tool as noted. In order to carry out this scheme, a basic "library" of standardized tools and tool holders and corresponding models thereof is established, this library consisting of a selection of various types of cutting tools and various types and sizes of tool holders which are standardized dimensionally such that for each given standard combination when it is installed in either the model or the actual machine tool the tool is located always in the same position with respect to the structure providing the relative movement between the workpiece and the tool.

In order to create this result in the context of a lathe in which the tool holders are mounted in T-slots with no precise means of locating the same with respect to the lathe turret, it may be necessary to replace such a T-slot structure with a precision mounting plate having a pattern of dowel locating holes machined therein for mounting the tool holders. Also, the tools and tool holder assemblies are assembled together with a standard predetermined location of the cutting tool bit in the tool holder.

For an example, it has been found that a library of standard tool holder tool combinations of 50 to 60 standards for an automatic bar chucking eight-station turret lathe with contouring capability is entirely adequate for the machining of a normal range of workpieces encountered. These standards would include tool holders such as a drill mount, a cutting tool offset holder of various lengths, and a variety of tools such as bar stock cut-off revolving stops, turning tools, plunge tools, drills, reamers, etc. The tools and tool holders are assembled together in some standard nominal offset with respect to the centerline of the workpiece, for lathe applications, while the axial or Z axis offset with respect to the turret would be set at various standard incremental dimensions, these dimensions defining in part the standard models of tool holders set forth in the library.

Referring to FIG. 1, the model representation of the corresponding machine tool is depicted for which a corresponding library of models of tools and tool holder combinations are prepared. This model is for a lathe in which an automatic tool changing mechanism is provided by an indexable 8-station turret of the type in which the turret is mounted on the centerline of the spindle since the particular lathe is of the type in which a tail stock is not incorporated.

The model includes a planar base surface 10 which has mounted thereto a transparent plastic drawing holder 12 which is adapted to receive an accurately scaled drawing 14 depicting the workpiece 16 to be machined, located with respect to a graphical representation 18 of the spindle face of the lathe. Also mounted on the base surface 10 is a cross-slide assembly 20 which mounts an octogonal clear plastic plate 22 corresponding to the 8-station turret for indexing rotation about pivot support 24 and mounted for rectilinear movement along the Z-axis and X-axis as indicated in FIG. 1 by means being supported on an X-axis cross-slide 26, which in turn is supported on a Z-axis cross-slide assembly 28.

The turret 22 is indexable through 8 positions so as to correspond to the indexing capability on the corresponding lathe, and for this purpose, the turret 22 has formed therein 8 dowel holes 30, one at each respective index position. A dowel plug is inserted at 32 in order to relatively precisely locate the turret 22 in each indexed position.

Turret 22 has in each octant thereof a precision hole pattern formed by sets of dowel bores 34 adapted to precisely locate any one of a series of the corresponding tool holder and tool combination models 36 which dowel plugs may be inserted through corresponding holes therein so as to locate the tool holder and tool combination models 36 with respect to the turret.

In the preferred form of the invention, the corresponding turret plate on the lathe would be affixed to the cross-slide assembly of the lathe with an exactly corresponding hole pattern, with the standardized tool holders adapted to be affixed to the turret plate in a similar fashion so that the tool holder and tool combinations would be precisely in the same geometric relationship as to the turret plate 22 on the model.

Scales are provided at 38 for the X-axis relative movement of the turret plate 22 and at 40 for the Z-axis relative movement of the turret plate 22 on the cross-slide assembly. A list of visual codes for programming may be advantageously imprinted on the surface of the support base 10 as depicted at 42 for reference by the programmer. The machine tool Z-axis scale 44 may also be advantageously included on the base 10 for reference purposes.

Since the model is utilized to some extent to scale certain positions of the turret 22, it is, of course, understood that the relationship of the scales 38 and 40, the sizing of the turret plate 22 and the models 36, as well as the drawing of the part 16 are all in a fixed scalar relationship to each other, preferably being at least full scale. Representations for very large parts and machine configurations may be possible by introducing a scalar factor into the model such that the representation of 1 inch for example on the scale 38 represents 2 or 4 inches, for example on the actual part, but this requires that the drawing 16 and the other dimensions be accordingly scaled up or down. It will, of course, be understood that these scales could be replaced with digital read-out devices to further simplify use of the model.

Figure 2:
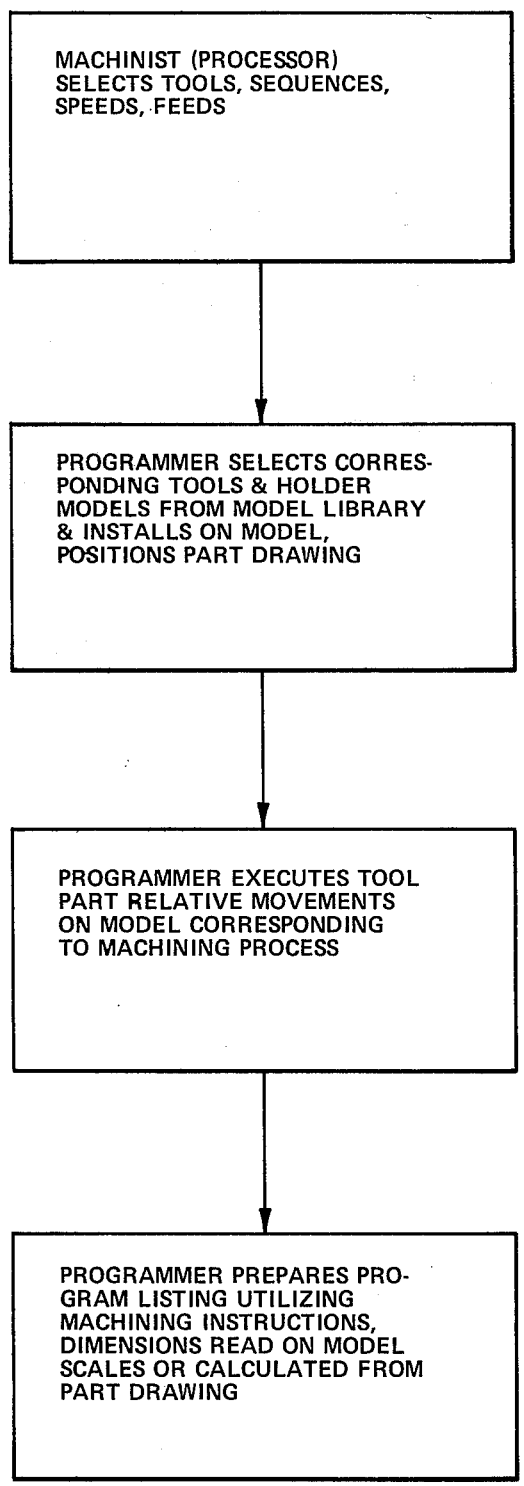
FIG. 2 is a block diagram flow sheet representation of the method according to the present invention.

Referring to FIG. 2, the block diagram flow sheet of the method of preparing control programs utilizing the above described model is depicted. Initial steps would be carried out by a machinist or other processing specialist who would upon a review of the part drawings, select the tools and tool holders from the library of standard models, set forth a sequence of machining steps utilizing such tools, and specify the spindle speeds and in-feed rates, etc. The programmer would then receive this information and from such information would select the corresponding models of the standard tools and tool holders from the model library installing the same on the appropriate turret station on the turret plate 22 of the model and would then also position the drawing of the workpiece to scale in the appropriate position with respect to the spindle face representation 18 on the base surface 10. The programmer, by referring to the sequencing steps specified by the machinist, executes by appropriate positioning of the turret plate 22 and sliding movement of the cross-slide assembly 20 the various movements corresponding to the actual machining steps. In so doing, the programmer then prepares a program listing obtaining much of the position information necessary from a reading of the scales 38 and 40. For example, the initial bar stock feed position, home position of the turret along the Z-axis slide necessary in order to provide indexing clearance, the rapid in-feed movements of the cross-slides, etc. may all be obtained directly from the scales 38 and 40 without the need for calculation. Only in obtaining the final finished dimensions must the programmer actually calculate the precise distances based on the dimensions which preferably have been notated on the drawing 14 in such a manner as to facilitate such calculations. It can be seen that this approach offers a great advantage over the aforementioned process inasmuch as a physical representation of the process at each machining sequence is provided allowing for much less tedious and error-prone program listings of the various steps and positions such that programming efforts after interruptions can be much more reliably begun at the point in the program at which the programmer left off. In addition, the majority of position calculation requirements are eliminated due to the use of scales 38 and 40.

Finally, the programming process itself is in very simple terms easily understood and would not involve a great deal of training of individuals in order to be carried out with the machinist's instructions. As noted above, the approach would be also applicable to three-axes machines, but in this case, a dimensional representation of the workpiece might be required as also would be a three-dimensional model representing the axes of movement of the machine tool.

Finally, a bit of serendipity is created by the use of standardized preset tools and tool holders in that set up time is greatly reduced and simplified, particularly for later runs of the same part. The use of preset tooling also eliminates downtime of the machine which can occur due to the programmer having to physically install the selected tooling in the machine during program in order to determine reliably its position therein, which often is resorted to by the programmer.

As noted above, this approach is also applicable to other machine tools having more axes of movement and other forms of automatic tool changers, the model being constructed correspondingly to whatever the configuration of the particular machine tool.

The embodiments of the invention in which an exclusive property or privilege is claimed are defined as follows:

1. A programming aid for use in preparing a control program for a numerically controlled machine tool for machining a workpiece, said machine tool including means for relatively moving and positioning a tool support and a workpiece supported therein under numerical control and further including automatic tool changing means for positioning and relatively moving a successive plurality of tools and holders on said support, the aid comprising:
   a model of said workpiece;
   a model of said machine tool, said model including a model of said tool support and models of said plurality of tools and holders and also including means mounting said models for relative moving and positioning thereof corresponding to said automatic tool changing and machining operations of said machine tool, said models being correspondingly scaled to each other in size and position, said model further including scales affixed along the axis of motion providing a measurement of said relative movements of said model of said workpiece and said model of said tool support corresponding to machining operations of said machine tool, whereby said model provides position information as an aid in preparing said control program.

2. The aid according to claim 1 wherein said plurality of tools and holders are preset and installed in said machine tool to be standardized dimensionally relative said tool support and wherein said models of said plurality of tools and holders are models of said preset standardized dimensions.

3. A method of preparing a control program for machining of a workpiece on a particular machine tool of the type wherein means for relatively moving a workpiece and tooling under numerical control is provided to carry out a machining process on said workpiece, the method including the steps of:
   establishing for said particular machine tool a library of preset standardized tooling including tools of standard types and dimensions and tool holders of standardized types and dimensions;
   selecting from said library the tooling for carrying out the machining of said workpiece;
   preparing model representations of said library of preset standardized tools and holders;
   preparing a model of said machine tool and said workpiece positioned in said machine tool including establishing affixed scales positioned on said model indicating the extent of movement of said machine tool in carrying out the machining process upon said workpiece, selecting models from said library corresponding to said selected tools and holders and including in said model means for placing said library models thereinto and also including means therein for relatively moving said model of said workpiece and said tools and tool holders in directions corresponding to those carried out in the particular machine tool in carrying out the machining process;

relatively moving said model representations in sequence corresponding to machining steps while preparing said control program.

4. The method of claim 3 further including the step of measuring the extent of at least one of said relative movements between said tooling and said workpiece, and using said measurements to establish machine positions in preparing said control program.

5. A method of preparing control program listings for numerically controlled machines of the type wherein tooling is supported for movement relative a workpiece supported therein under numerical control to carry out a process, the method including the steps of:

preparing model representations of said tooling and said workpiece, including means for relatively moving said model of said tooling and said model of said workpiece in directions corresponding to said relative movement of said tooling and said workpiece in said machine tool;

measuring the extent of at least some of said relative movements carried out with said model representations by establishing scales affixed to said models;

preparing a program listing while moving said models relative each other in a sequence corresponding to the actual process steps to be carried out on the workpiece, and utilizing said measurements to determine tooling and workpiece relative positions in preparing said program listing, whereby a physical representation of said sequence is provided the programmer.

* * * * *